United States Patent [19]
Holden
[11] 3,827,742
[45] Aug. 6, 1974

[54] FIXTURE FOR HANDLING PANEL ARTICLES

[76] Inventor: Jimmie H. Holden, Rt. 1 Box 66, Athens, Ala. 35611

[22] Filed: May 7, 1973
[21] Appl. No.: 358,240

[52] U.S. Cl. .................... 294/16, 294/31 R, 294/62
[51] Int. Cl. .................... B65g 7/12
[58] Field of Search .......... 294/16, 27 R, 27 H, 28, 294/29, 31 R, 34, 62, 63 B, 92, 104, 106; 224/45 F, 45 P, 45 Q

[56] References Cited

UNITED STATES PATENTS

| | | | |
|---|---|---|---|
| 1,386,929 | 8/1921 | Hartman | 294/16 |
| 1,472,926 | 11/1923 | McDonald | 294/34 |
| 1,495,179 | 5/1924 | Hoffer | 294/16 |
| 2,778,668 | 1/1957 | Tomek et al | 294/16 |
| 3,061,350 | 10/1962 | Miller | 294/16 |
| 3,436,112 | 4/1969 | Pasquine | 294/62 |

*Primary Examiner*—Evon C. Blunk
*Assistant Examiner*—Johnny D. Cherry
*Attorney, Agent, or Firm*—L. D. Wofford, Jr.; J. H. Beumer; J. R. Manning

[57] ABSTRACT

A fixture for gripping and handling fragile panel articles by their edges. The fixture includes a pair of bars disposed in slightly overlapped longitudinal relation. A transverse pivot pin is located between opposed bar faces intermediate the area of overlap, and the overlapped ends are adjustably secured to one another by clamping means on either side of the pivot pin. The other ends of the bars have attached thereto perpendicularly extending gripping members providing a pair of opposed gripping surfaces adapted to engage a panel by its edges. Movement of gripping surfaces together and apart is controlled by adjustment of the clamping means.

6 Claims, 3 Drawing Figures

FIXTURE FOR HANDLING PANEL ARTICLES

ORIGIN OF THE INVENTION

The invention described herein was made by an employee of the United States Government and may be manufactured and used by or for the Government of the United States of America for governmental purposes without the payment of any royalties thereon or therefor.

BACKGROUND OF THE INVENTION

This invention relates to gripping and handling fixtures and more particularly to fixtures for gripping and handling panel articles.

Assembly of solar cell arrays for space power generation has presented difficulty owing to the fragile nature of solar cells and associated components. Solar cell arrays are typically made up of rectangular panel assemblies, known as "modules", adapted to fit on supporting frames of a deployable wing structure. Each of the modules has a honeycomb panel substrate upon which are mounted hundreds of individual silicon solar cells and interconnecting means, the cells being covered by thin glass slides. During assembly of the array the modules must be guided into position onto the supporting frame with very little access space available between edges of adjacent modules for tools or handling fixtures. Unavoidable hand touching of glass slides during assembly operations utilizing available equipment has resulted in extensive breakage of glass slides and underlying solar cells, requiring costly repair of the modules involved. A need thus exists for a fixture capable of gripping and handling panel modules by their edges in a manner such that the danger of breaking fragile components on module faces is minimized.

SUMMARY OF THE INVENTION

In accordance with the present invention there is provided a panel gripping and handling fixture in which movement of panel-edge-engaging surfaces together and apart results from movement of overlapping bar ends around a transverse pivot pin, the panel-edge-engaging surfaces being located on members that extend perpendicularly from the other ends of the bars. Relative planar positions of the overlapped bar ends are controlled by adjustable clamping means securing the overlapped ends together on either side of the pivot pin.

It is therefore an object of this invention to provide a fixture for gripping and handling panel articles by their edges.

Another object is to provide a panel-edge gripping fixture having a precisely controllable gripping action.

Still another object is to provide a fixture for handling panel articles without breaking fragile components mounted on the faces thereof.

Other objects and advantages of the invention will be apparent from the following detailed description and the accompanying drawings in which like reference numerals designate the same or similar parts.

DESCRIPTION OF THE PREFERRED EMBODIMENT

Figure 3:
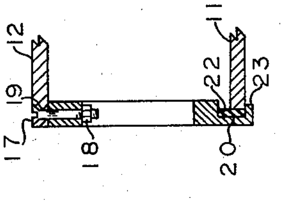
FIG. 3 is a sectional view taken along line 3—3 of FIG. 1.
Figure 1:
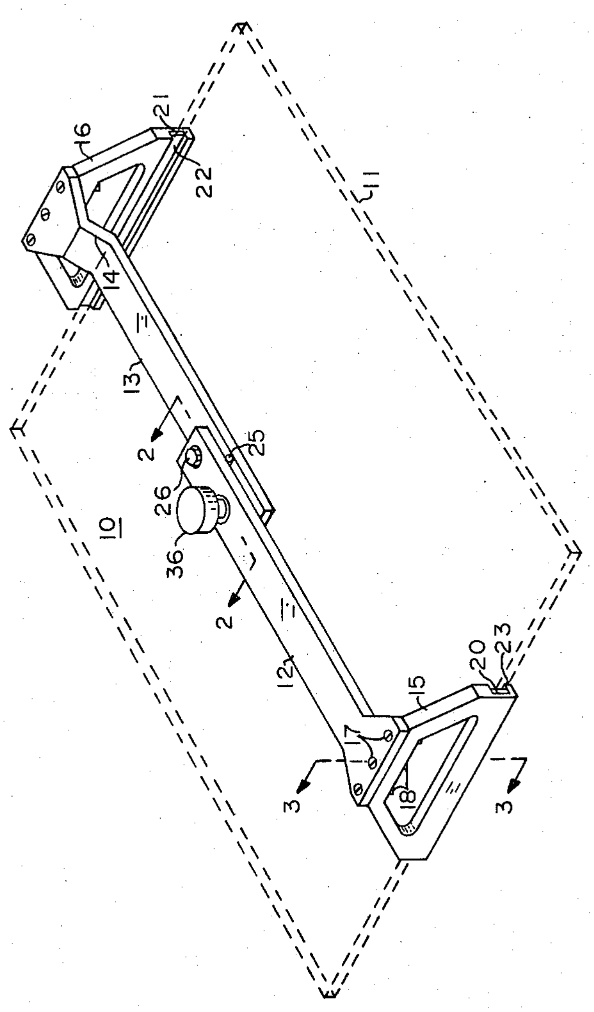
FIG. 1 is a perspective view showing a fixture embodying the invention.

Referring to FIG. 1 of the drawing, there is shown a fixture 10 for gripping a rectangular panel article 11 by opposing edges thereof. The fixture includes a first flat bar 12 and a second bar 13 in longitudinal alinement with and slightly overlapping bar 12. Bar 13 has its outer end offset upward at bend 14 so that its outer end is substantially coplanar with bar 12 when the fixture is in panel-engaging position. Bars 12 and 13 have attached to their outer ends gripping members 15 and 16, respectively, disposed perpendicular to the bar ends and transverse to the length of the bars. Opposing faces of the gripping members are provided with means for engaging panel edges. In the embodiment shown such means comprises opposing grooves 20 and 21 of rectangular cross-sectional and adapted to receive panel edges, the bases of the grooves having deposited thereon a coating 22 of elastomeric material such as neoprene rubber so as to cushion the panel edges upon engagement and to keep the panel from slipping with minimum application of pressure when turned to the vertical position for installation. As shown in FIG. 3, the lower edges of the gooves are defined by shoulders 23 extending across the bases of the gripping members.

A pivot pin 25 secured to bar 13 is located between bars 12 and 13 intermediate to the overlapping area of the bar faces and transverse to the length of the bars. The bars are movably clamped together on one side of the pivot pin by means of a bolt 26 penetrating bars 12 and 13 through holes 27 and 28, respectively, the bolt being provided with a compression spring 29 secured by a threadably connected nut 30 for biasing action. On the other side of the pivot pin, and spaced apart from the pin the same distance as bolt 26, a hand-adjustable bolt 31 is disposed through holes 32 and 33 in bars 12 and 13, respectively, and is secured by threadably connected nut 34, the latter nut being affixed to the bottom of bar 13 by means such as welding. Bolt 31 has a thumb-screw head 36 to facilitate hand turning and a washer 35 of self-lubricating material such as Teflon disposed between head 36 and the top of bar 13 to prevent galling or locking. In order to accommodate planar movement of the overlapped bar ends, holes 27 and 32 of bar 12 are slightly elongated in the longitudinal direction.

Figure 2:
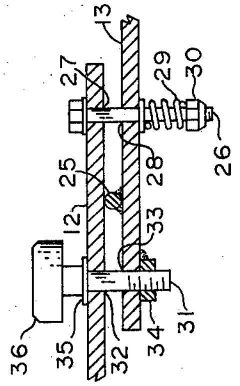
FIG. 2 is a sectional view taken along line 2—2 of FIG. 1.

In operation of the fixture, panel-engaging surfaces of grooves 20 and 21 are moved together and apart to grasp and release panel edges by turning thumb-screw head 36. Upon tightening of bolt 31, the inner end of bar 13 is forced upward toward bar 12, the latter pivoting around pin 25, bringing opposed grooves 20 and 21 together. Loosening of bolt 31 conversely moves the inner end of bar 13 away from bar 12 and forces grooves 20 and 21 apart from one another. The extent of movement available for engagement and disengagement depends upon the diameter of the pivot pin, and a larger pin can be used to obtain greater movement. In FIG. 2 bars 12 and 13 are shown in an intermediate, parallel position; the bars can be moved until they come into contact on either side of the pin.

Precise control over movement of panel engaging surfaces and the amount of force applied to panel edges thereby can be realized by modifications to the adjustable clamping means. In the embodiment shown, bolt 31 and nut 34 can be provided with fine threads to provide gradual engagement action. Thumb screw head 36 can include conventional torque-limiting means to prevent application of force beyond a predetermined level or to prevent excessive thread wear.

In the embodiment shown the gripping members are in the form of upwardly tapered trapezoidal parts having opposed grooves near the bases thereof and having a central portion of material removed. It is to be understood that various other configurations can be used, the design of the opposed gripping members depending on the particular articles for which the fixture is to be employed. For example, for certain applications the shoulder represented by 23 in the embodiment shown could be omitted so as to avoid any contact of the fixture with the bottom face of the panel. Other features which can be incorporated in fixtures embodying the invention include gripping means such as a rubber or plastic coating on one or both of the bars conforming to the shape of the hand and means for adjusting the length of the bars so as to enable panel articles of different sizes to be handled with one fixture. Furthermore, fixtures embodying the invention can be secured together to provide means for gripping larger panel articles at more than one location, and a capability for gripping all four edges of rectangular panels can be provided by disposing two fixtures transverse to one another, either unattached or secured together.

With regard to materials of construction, the bars are preferably made of metal such as steel and of sufficient thickness to be substantially rigid in operation. The gripping members should be slightly flexible to prevent breakage of fragile panel components upon engagement, and the use of plastic members with a central portion thereof removed is preferred.

While the invention is described in terms of a fixture for handling panel articles, it could be used for other purposes by modifying the configuration of the gripping members to conform to the shape of the article being gripped or handled. For example, gripping means can be provided on the outside of the depending gripping members so as to engage articles by outward movement.

Various other changes and modifications to the fixture described above can be made by one skilled in the art without departing from the invention.

What is claimed is:

1. A gripping fixture comprising:

a. a pair of bars in longitudinally overlapping relation with one end portion of each bar disposed in face-to-face relation with respect to one end of the other bar;

b. a pivot pin disposed between said bars transverse to their length and intermediate to the area of overlap of the bars;

c. clamping means movably securing the faces of said bars together on both sides of said pin; and d. a pair of opposed gripping members depending from the outer ends of said bars;

e. the clamping means on one side of said pin including adjustment means for forcing said bar faces together and apart on that side, thereby varying the planar positions of said bars around said pivot pin and bringing said opposed gripping members together and apart.

2. A fixture for gripping panel articles comprising:

a. a pair of bars in longitudinally overlapping relation with one end portion of each bar disposed face-to-face with respect to one end of the other bar;

b. a pivot pin disposed between and in contact with said bars transverse to their length and intermediate to the area of overlap of the bars;

c. clamping means movably securing the faces of said bars together on both sides of said pin and adapted to vary the planar positions of said bar faces around said pin;

d. said clamping means comprises on one side of said pin a spring biasing said bar faces together and means securing said spring and on the other side of said pin a hand-adjustable bolt penetrating said bars and adapted to threadably engage a nut affixed to an outside bar face so that upon rotation of said bolt said bar faces are brought together or apart on said other side of said pin;

e. a pair of opposed gripping members depending perpendicularly from the outer ends of said bars and having surfaces adapted to move together and apart for panel engagement and disengagement in response to variations in the planar positions of said bar faces.

3. The fixture of claim 2 including in said gripping members a pair of opposed grooves adapted to engage opposed edges of a panel article.

4. The fixture of claim 3 including a layer of elastomeric material covering the bases of said grooves.

5. The fixture of claim 4 including torque limiting means in said hand-adjustable bolt.

6. The fixture of claim 5 wherein said spring means is a compression spring and the means securing the same is a bolt penetrating said bar faces and a nut therefor.

* * * * *